(12) United States Patent
Rivera et al.

(10) Patent No.: US 8,490,200 B2
(45) Date of Patent: Jul. 16, 2013

(54) TECHNIQUES FOR CAPTURING IDENTIFYING INFORMATION ON A DEVICE USER

(75) Inventors: David Rivera, Durham, NC (US); David C. Challener, Raleigh, NC (US); Rod D. Waltermann, Rougemont, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1000 days.

(21) Appl. No.: 12/054,531

(22) Filed: Mar. 25, 2008

(65) Prior Publication Data

US 2009/0249485 A1 Oct. 1, 2009

(51) Int. Cl.
*H04L 29/06* (2006.01)

(52) U.S. Cl.
USPC .............................................. 726/26; 726/35

(58) Field of Classification Search
USPC .............. 726/26, 34, 35, 2; 755/456.1, 404.2, 755/410, 411
See application file for complete search history.

(56) References Cited

U.S. PATENT DOCUMENTS

| | | | |
|---|---|---|---|
| 7,134,006 B2 * | 11/2006 | Flanigan | 713/1 |
| 7,446,655 B2 * | 11/2008 | Jha et al. | 340/539.13 |
| 2005/0183143 A1 * | 8/2005 | Anderholm et al. | 726/22 |
| 2007/0273479 A1 * | 11/2007 | Jung et al. | 340/5.81 |
| 2008/0018927 A1 * | 1/2008 | Martin et al. | 358/1.15 |
| 2008/0132245 A1 * | 6/2008 | Snow et al. | 455/456.1 |
| 2008/0186162 A1 * | 8/2008 | Rajan et al. | 340/539.13 |

* cited by examiner

*Primary Examiner* — Ali Abyaneh
(74) *Attorney, Agent, or Firm* — Antony P. Ng; Yudell Isidore Ng Russell PLLC

(57) ABSTRACT

A technique for identifying a user of a device includes receiving a tracking mechanism trigger and capturing (e.g., periodically) identifying information on the user of the device in response to the trigger.

9 Claims, 2 Drawing Sheets

TECHNIQUES FOR CAPTURING IDENTIFYING INFORMATION ON A DEVICE USER

BACKGROUND

1. Field

This disclosure relates generally to capturing identifying information and, more specifically, to techniques for capturing identifying information on a device user.

2. Related Art

Laptop computer system are frequently stolen from locations such as coffee shops, college campuses, hotel rooms, homes, businesses, and motor vehicles. In general, theft of a computer system may result in the loss of photos, files, personal information, and business information that is stored on the stolen computer system. Today, devices such as desktop computer systems, notebook computer systems, laptop computer systems, and personal digital assistants (PDAs) usually execute a wide variety of applications.

For example, a theft recovery application (e.g., LoJack®) may be installed on a computer system (e.g., a portable (such as a laptop or notebook) or a desktop computer system) to facilitate tracking, locating, and recovering the computer system when the computer system is reported stolen. The installed theft recovery application, upon activation, reports a location of the computer system to a monitoring center (when the computer system is coupled to the Internet via a wired or wireless connection). In this case, based on a reported theft, authorities may be notified to recover the stolen computer system. Unfortunately, even when authorities recover a stolen computer system, the authorities frequently do not have sufficient evidence to prosecute an individual in possession of the stolen computer system for the theft of the computer system or receiving stolen property.

SUMMARY

According to one aspect of the present disclosure, a technique for identifying a user of a device (e.g., a computer system) includes receiving a tracking mechanism trigger and capturing (e.g., periodically) identifying information on the user of the device in response to the trigger. The captured identifying information may then be utilized by authorities (as evidence) to prosecute an individual in possession of a stolen device for the theft of the device or receiving stolen property.

According to another aspect of the present disclosure, a computer system includes an input device, non-volatile storage, and a processor coupled to the non-volatile storage and the input device. The processor is configured to receive a tracking mechanism trigger and control the input device to capture identifying information on a user of the computer system in response to the trigger. The processor is also configured to store the identifying information in the non-volatile storage, such that the identifying information may be later recovered by authorities and used as evidence in prosecution of the user.

BRIEF DESCRIPTION OF THE DRAWINGS

The present invention is illustrated by way of example and is not intended to be limited by the accompanying figures, in which like references indicate similar elements. Elements in the figures are illustrated for simplicity and clarity and have not necessarily been drawn to scale.

DETAILED DESCRIPTION

Figure 1:
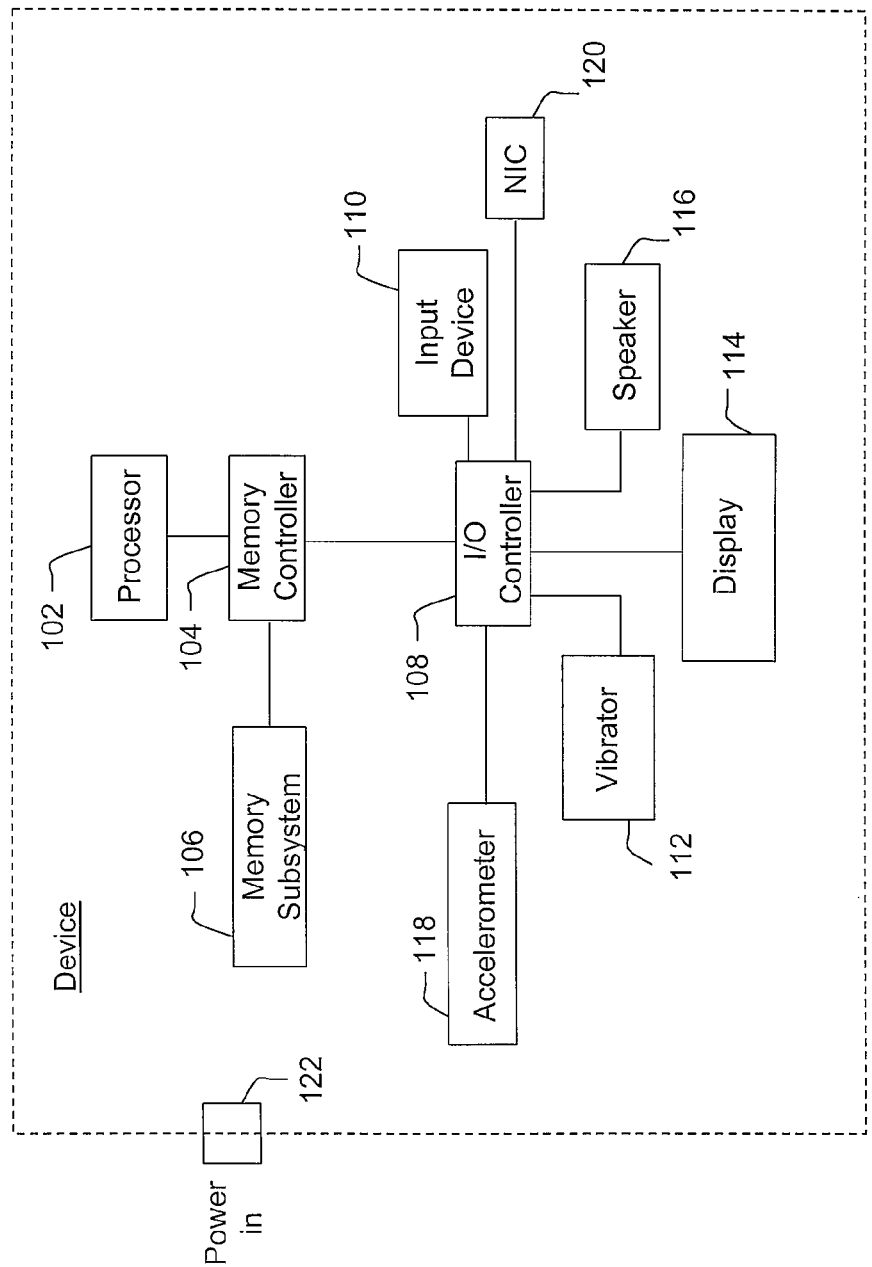
FIG. 1 is a block diagram of a relevant portion of an example device (e.g., a computer system) that is configured to identify a user of the device, according to various embodiments of the present disclosure.

As will be appreciated by one of ordinary skill in the art, aspects of the present invention may be embodied as a method, system, device, or computer program product. Accordingly, the present invention may take the form of an entirely hardware embodiment, an entirely software embodiment (including firmware, resident software, microcode, etc.) or an embodiment combining software and hardware aspects that may all generally be referred to herein as a circuit, module, or system.

Any suitable computer-usable or computer-readable storage medium may be utilized. The computer-usable or computer-readable storage medium may be, for example, (but is not limited to) an electronic, magnetic, optical, electromagnetic, infrared, or semiconductor system, apparatus, or device. More specific examples (a non-exhaustive list) of the computer-readable storage medium includes the following: a portable computer diskette, a hard disk, a random access memory (RAM), a read-only memory (ROM), an erasable programmable read-only memory (EPROM) or flash memory, a portable compact disc read-only memory (CD-ROM), an optical storage device, or a magnetic storage device. Note that the computer-usable or computer-readable storage medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this disclosure, a computer-usable or computer-readable storage medium may be any medium that can contain or store a program for use by or in connection with an instruction execution system, apparatus, or device. As used herein, the term "coupled" includes both a direct electrical connection between blocks or components and an indirect electrical connection between blocks or components achieved using one or more intervening blocks or components.

According to various aspects of the present disclosure, techniques may be employed that aid authorities (law enforcement) in the prosecution of an individual in wrongful possession of a device (e.g., computer system) by capturing identifying information on the individual. According to various disclosed techniques, a theft recovery application on a computer system is activated (in response to a received tracking mechanism trigger) after a theft of the computer system is reported to a device recovery service provider. The trigger is used to initiate capture of identifying information on a user of the computer system. The identifying information may include various biometric information, depending on individual capabilities of the computer system. For example, a computer system with an integrated camera may capture one or more pictures of the user following the trigger. As another example, a computer system with integrated speech capability may capture voice of the user (via a microphone) following the trigger. As yet another example, a computer system with an integrated fingerprint reader may capture a fingerprint of the user following the trigger.

With reference to FIG. 1, an example device 100 is illustrated that may be configured to capture identifying information on a user of the device 100 in response to a tracking mechanism trigger, according to various embodiments of the present disclosure. In a typical situation, the trigger is generated by a device recovery service provider in response to receiving a reported theft of the device 100. The device 100 may be, for example, a computer system or a smart phone that executes an operating system (OS) and multiple applications, one of which is a theft recovery application. The device 100 includes a processor 102 that is coupled to a memory controller 104, which is coupled to a memory subsystem 106 and an input/output (I/O) controller 108. As is illustrated, the I/O controller 108 is coupled to an input device 110, a vibrator 112, a display 114, a speaker 116, an accelerometer 118, and a network interface controller (NIC) 120, which may facilitate a wired or wireless Internet connection.

The processor 102 may include one or more processor cores and one or more levels of cache. The memory subsystem 106 includes an application appropriate amount of volatile memory (e.g., dynamic random access memory (DRAM)) and non-volatile memory (e.g., read-only memory (ROM) and/or flash memory). The input device 110 may include, for example, a pointing device (such as a mouse), a keyboard, a microphone, a fingerprint reader, and a camera, among other input devices. The display 114 may be, for example, a cathode ray tube (CRT) or a liquid crystal display (LCD). The processor 102 may also be coupled to one or more mass storage devices (not shown), e.g., non-volatile storage such as a hard disk drive (HDD) and/or a compact disc read-only memory (CD-ROM) drive, via a port. As is illustrated, the device 100 also includes a power-in port 122 for receiving a power adapter cable or an AC power cable.

Figure 2:
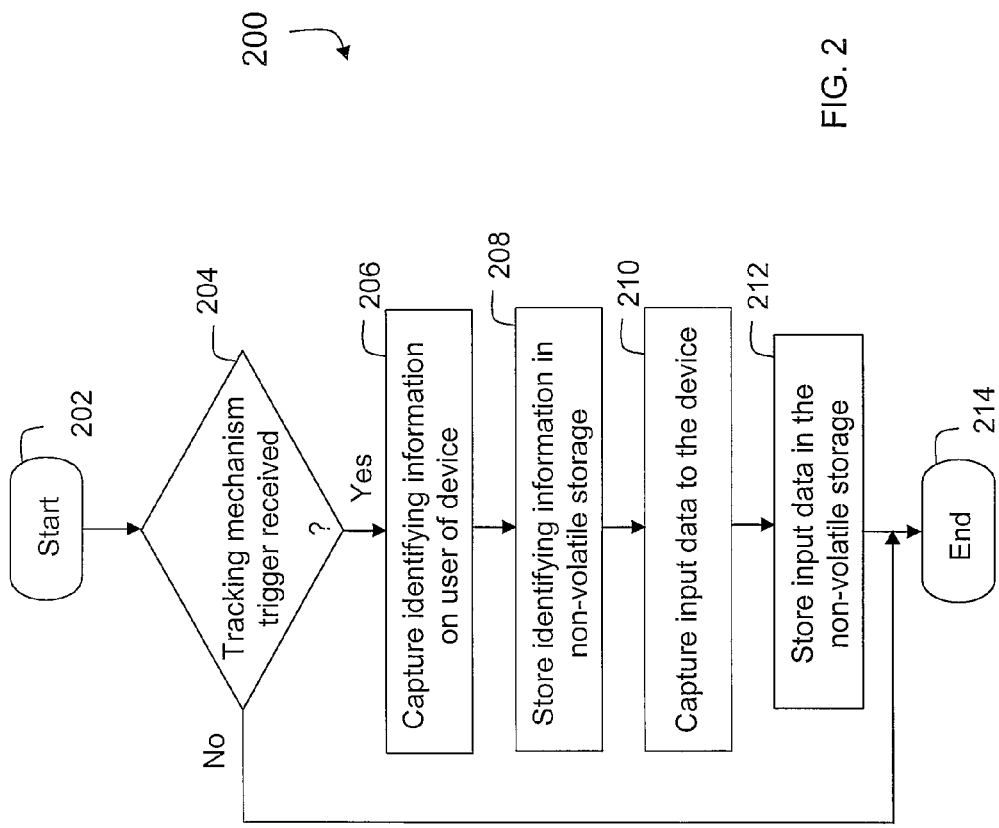
FIG. 2 is a flowchart of a process for identifying a user of a device (e.g., a computer system), according to an embodiment of the present disclosure.

With reference to FIG. 2, an example process 200 for identifying a user of a device (such as the device 100), according to an embodiment of the present disclosure, is illustrated. In block 202, the process 200 is initiated at which point control transfers to decision block 204. In block 204, the processor 102 determines whether a tracking mechanism trigger has been received. If a tracking mechanism trigger is not received in block 204, control transfers to block 214, where the process 200 terminates. If a tracking mechanism trigger is received in block 204, control transfers to block 206 where identifying information on a user of the device 100 is captured (e.g., under the control of a basic input/output system (BIOS)), which periodically enables one or more of the devices included in the input device 110. For example, the identifying information may correspond to voice (captured by a microphone) of the user, a picture (captured by a camera) of the user, a fingerprint (captured by a fingerprint reader) of the user, or other biometric information of the user.

Next, in block 208, the identifying information is stored in non-volatile storage of the device 100. For example, the non-volatile storage may correspond to an HDD or flash memory that is only accessible by the BIOS. Alternatively, or in combination with storing the identifying information in the non-volatile storage device, the identifying information may be transmitted to a device recovery service provider (or other entity) via, for example, an Internet connection. Then, in block 210, the processor 102 captures input data (e.g., provided by the user via a pointing device or a keyboard) to the device 100. The input data may for example, provide an indication of web sites visited by the user, among other information. Next, in block 212, the processor 102 causes the input data to be stored in the non-volatile storage. Alternatively, or in combination with storing the input data in the non-volatile storage device, the input data may be transmitted to a device recovery service provider (or other entity) via, for example, an Internet connection. Following block 212, control transfers to block 214 where the process 200 terminates.

Accordingly, techniques have been disclosed herein that readily facilitate identifying a user of a device in response to a tracking mechanism trigger associated with a theft recovery application.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method for associating an unauthorized user with a stolen computer system, said method comprising:

in response to a receipt of a tracking mechanism trigger by a computer system via a wireless network, wherein said tracking mechanism trigger is received in response to a reported theft of said computer system, capturing identifying information on an unauthorized user of said computer system under control of a basic input/output system (BIOS), and storing said identifying information in a non-volatile storage device that is only accessible by said BIOS of said computer system;

capturing data entered into said computer system from a keyboard by said unauthorized user under the control of said BIOS, and storing said data in said non-volatile storage device; and wirelessly transmitting said data and said identifying information to a device recovery service provider.

2. The method of claim 1, wherein said identifying information includes biometric information of said unauthorized user.

3. The method of claim 2, wherein said biometric information includes voice, a picture, or a fingerprint of said unauthorized user.

4. A computer-readable storage device having a computer program product for associating an unauthorized user with a stolen computer system, said computer-readable storage device comprising:

program code for, in response to a receipt of a tracking mechanism trigger by a computer system via a wireless network, wherein said tracking mechanism trigger is received in response to a reported theft of said computer system, capturing identifying information on an unauthorized user of said computer system under control of a basic input/output system (BIOS), and storing said identifying information in a non-volatile storage device that is only accessible by said BIOS of said computer system;

capturing data entered into said computer system from a keyboard by said unauthorized user under the control of said BIOS, and storing said data in said non-volatile storage device; and program code for wirelessly transmitting said data and said identifying information to a device recovery service provider.

5. The computer-readable storage device of claim 4, wherein said identifying information includes biometric information of said unauthorized user.

6. The computer-readable storage device of claim 5, wherein said biometric information includes voice, a picture, or a fingerprint of said unauthorized user.

7. A computer system, comprising:

a keyboard;

a non-volatile storage device; and a processor, coupled to said non-volatile storage device and said keyboard, wherein said processor, in response to a receipt of a tracking mechanism trigger by said computer system via a wireless network, wherein said tracking mechanism trigger is received in response to a reported theft of said computer system, captures identifying information on an unauthorized user of said computer system under the control of a basic input/output system (BIOS), and storing said identifying information in a non-volatile storage device that is only accessible by said BIOS of said computer system;

captures data entered into said computer system from a keyboard by said unauthorized user under the control of said BIOS, and storing said data in said non-volatile storage device; and a network interface card for wirelessly transmitting said data and said identifying information to a device recovery service provider.

8. The computer system of claim 7, wherein said identifying information includes biometric information of said unauthorized user.

9. The computer system of claim 8, wherein said biometric information includes voice, a picture, or a fingerprint of said unauthorized user.

* * * * *